No. 865,845. PATENTED SEPT. 10, 1907.
D. F. AKIN.
LAND AND WATER VEHICLE.
APPLICATION FILED MAY 17, 1906.
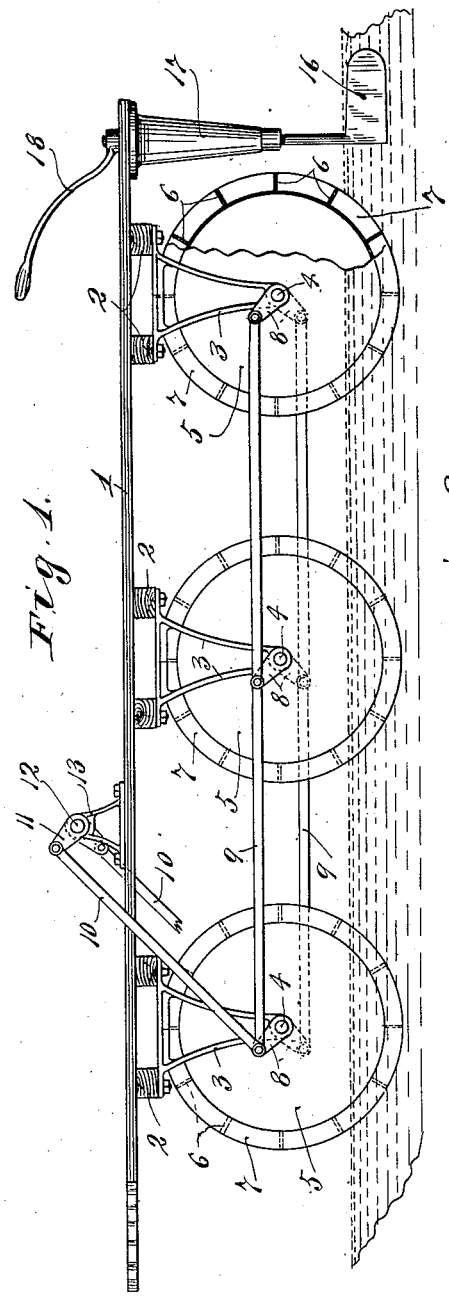
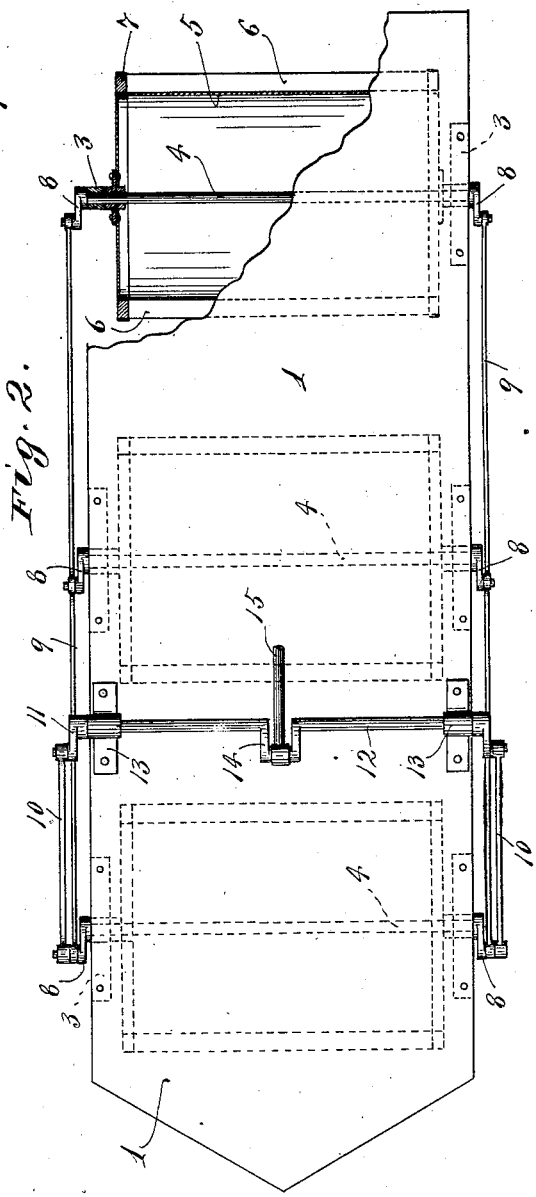
Witnesses
A. H. Opsahl.
E. W. Jeppesen.
Inventor
Daniel F. Akin
By his Attorneys
Williamson Merchant

UNITED STATES PATENT OFFICE.

DANIEL F. AKIN, OF FARMINGTON, MINNESOTA.

LAND AND WATER VEHICLE.

No. 865,845.  Specification of Letters Patent.  Patented Sept. 10, 1907.

Application filed May 17, 1906. Serial No. 317,296.

*To all whom it may concern:*

Be it known that I, DANIEL F. AKIN, a citizen of the United States, residing at Farmington, in the county of Dakota and State of Minnesota, have invented certain new and useful Improvements in Land and Water Vehicles; and I do hereby declare the following to be a full, clear, and exact description of the invention, such as will enable others skilled in the art to which it appertains to make and use the same.
My invention has for its object to provide a vehicle which without alteration or change is adapted to run either over land or water, and which is capable of attaining high speed.

To the above ends the invention consists of the novel devices and combinations of devices hereinafter described and defined in the claims.

The invention is illustrated in the accompanying drawings, wherein like characters indicate like parts throughout the several views.
Referring to the drawings: Figure 1 is a view in side elevation showing the improved vehicle, and Fig. 2 is a plan view of the said vehicle, some parts being broken away.

The vehicle body may take any suitable form, such as that of an automobile body or even a boat body, if desired, but in the drawings it is shown in the simplest possible form being made up of a platform 1 having transverse beams 2. Rigidly bolted or otherwise secured to the beams 2, at each side of the platform 1, is a plurality (as shown three) of depending bearing brackets 3. Three transverse shafts 4 are journaled in the oppositely disposed bearing-brackets 3, and to each of these shafts is rigidly secured an air-tight drum 5, which drums are filled only with air, or with some lighter fluid such as gas, to give the proper buoyancy to the vehicle when on the water. These drums are provided on their peripheries with longitudinally extended ribs 6 that act as paddles when running in the water. To the opposite ends of each drum 5 are secured tires 7 that project beyond the paddles 6, and are adapted to run upon the ground.

To the ends of the shafts 4 are secured short cranks 8. The wrist pins of the three cranks on the same side of the vehicle are connected in parallel by a long connecting rod 9. The wrist pins of the cranks 8 of the most forward shaft 4 are extended outward, and are pivotally connected to short crank rods 10 which, in turn, are reciprocated by cranks 11 secured on the ends of a transverse driving shaft 12 mounted in suitable bearings 13 on the platform 1. In practice this driving shaft 12 will be driven by a suitable motor (not shown), but which will be mounted on or carried by the platform 1, and will be suitably connected to the said shaft. For this purpose the said shaft is shown as provided with an intermediate crank 14, to which an engine-driven crank rod 15 is shown as connected.

The numeral 16 indicates a rudder, the stem of which is journaled in a suitable bearing 17 on the rear portion of the platform 1, the said stem having an ordinary operating lever 18 for manipulating the rudder.

When the vehicle is run on a road or solid ground, or over ice or snow, the tires 7 will bear upon the roadway, and the vehicle will be driven by traction. When the device is run upon water the air drums 5 will be partly submerged in the water to a depth depending upon the weight of the vehicle, the size and number of said drums, and the load carried by the vehicle. The drums being then rotated the paddles 6 will act upon the water and cause the vehicle to travel over the water. It should be noted that the cranks 8, which are on the opposite sides of the vehicle, are set on "quarters", or one ahead of the other, and that the two cranks 11 of the driving shaft 12 are correspondingly set so as to avoid dead-centers. When the vehicle is run over solid ground the rudder 16 may be raised, and it may be secured in a raised position by any suitable means (not shown).

I claim as my invention.

The combination with a vehicle body, of a plurality of air containing drums 5 supporting the same, the exposed peripheral surfaces of which drums are of true cylindrical form, laterally spaced tires. 7 projecting concentrically from the end portions of said cylindrical drums, imperforate radial paddle blades 6 applied to the exteriors of said drums, extending longitudinally thereof between the said laterally spaced tires and coöperating with said tires and drums to form a multiplicity of peripheral pockets adapted independently to hold air caged therein, and positively driven connections for causing the said drums to rotate in unison, substantially as described.

In testimony whereof I affix my signature in presence of two witnesses.

DANIEL F. AKIN.

Witnesses:
W. A. GRAY,
A. C. THOMAS.